United States Patent Office 3,362,183
Patented Jan. 9, 1968

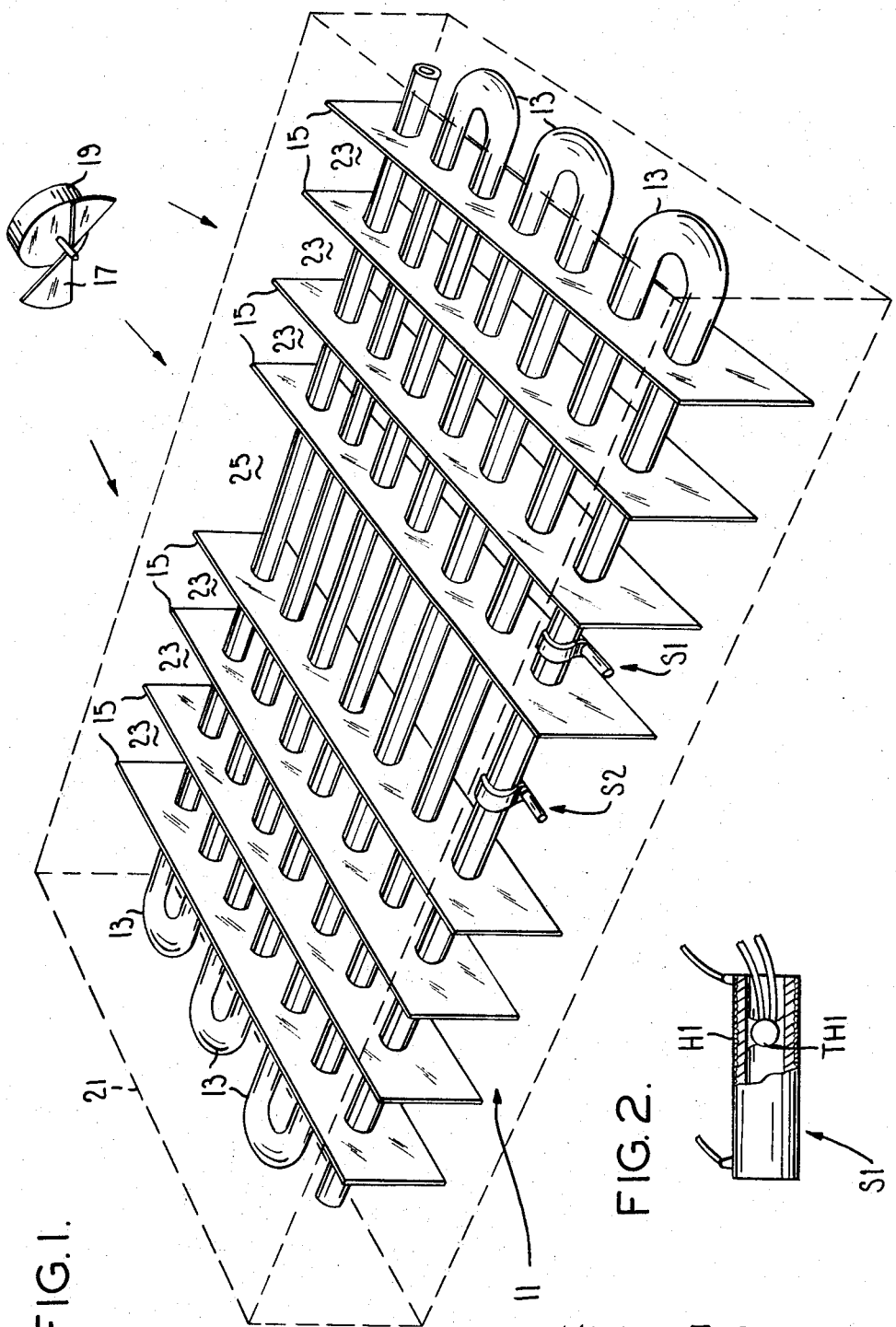

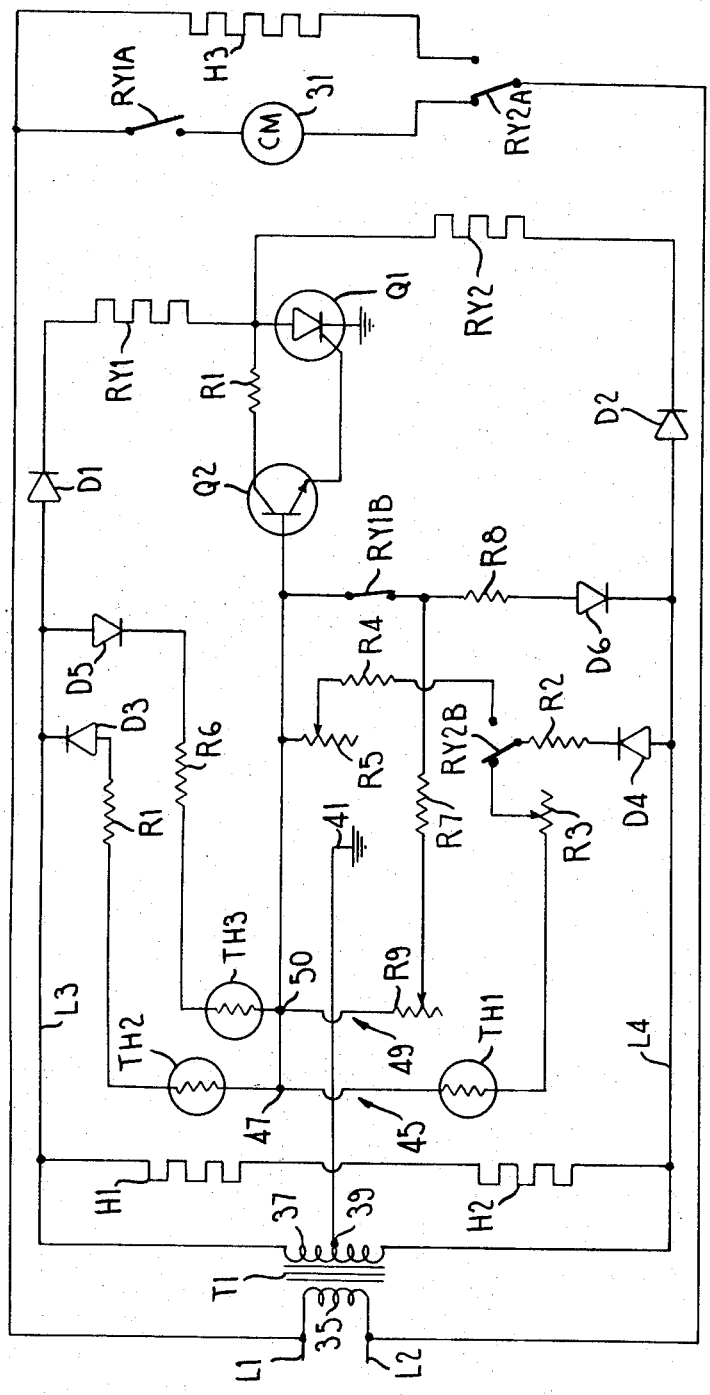
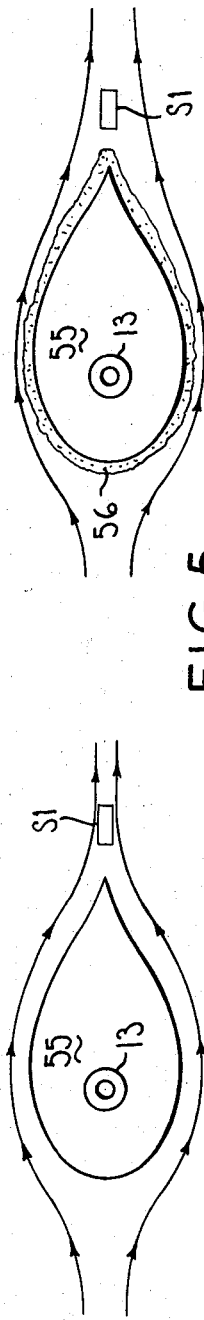
FIG. 3.
FIG. 5.
FIG. 4.

3,362,183
FLUID FLOW CONTROL IN REFRIGERATION SYSTEMS
Walter T. Sutton, Jr., Lexington, Ky., assignor to Texas Instruments Incorporated, Dallas, Tex., a corporation of Delaware
Filed Jan. 21, 1966, Ser. No. 522,259
12 Claims. (Cl. 62—140)

ABSTRACT OF THE DISCLOSURE

Apparatus is disclosed for automatically defrosting a heat exchange surface in refrigeration apparatus. A first heat dissipating device including a thermistor is located in a first flow path, which path becomes relatively obstructed by the buildup of frost. A second heat dissipating device including a respective thermistor is located in a reference flow path which remains relatively unobstructed as frost builds up. The two thermistors are connected in series to provide at a junction therebetween a voltage which varies as a function of the relative temperatures of the devices and thus also as a function of the relative flow rates in the two paths. The apparatus includes circuit means responsive to the voltage provided at said junction for energizing a defroster to remove the frost when the temperature of the first device increases in relation to the temperature of the second device due to obstruction of the respective flow path.

---

This invention relates to apparatus for controlling fluid flows and more particularly to such apparatus which will correct the relative fluid velocities in a pair of fluid flow paths to maintain the velocity in the first path within preselected limits relative to the fluid velocity in the second path.

In many systems it is desired to maintain a preselected level of fluid flow along a given path. In refrigeration apparatus it is typically imporant to maintain a free flow of air or other fluid past the evaporator or other heat exchange surface so that an efficient thermal cycle is maintained. If frost builds up on the evaporator, the air flow may be severely restricted and the heat interchange mechanism rendered highly inefficient. A heater or other defrost mechanism is typically provided for removing the frost when necessary. Various systems have been provided heretofore for initiating a defrosting operation, for example by defrosting at timed intervals or after a predetermined number of door openings in the case of domestic refrigerators. However, it is desirable that the initiation of defrosting be controlled in response to the actual buildup of frost so that efficient operation is provided. Various systems have been proposed which would sense the actual buildup of frost but these systems typically detect frost at one point only and do not operate satisfactorily if the frost buildup is not uniform.

Among the several objects of the invention may be noted the provision of fluid flow control apparatus which will maintain the fluid velocity in a first path within preselected limits relative to the fluid velocity in a second path; the provision of an automatic defrosting system which is responsive to the actual buildup of frost on a heat exchange surface; the provision of such a system which responds to frost buildup on a substantial portion of a heat exchange surface which is to be defrosted rather than the frost buildup at a single point; the provision of such a system which responds to the buildup of frost beyond a preselected level for initiating a defrotsing operation for removing the buildup; the provision of such a system which is efficient and reliable; and the provision of such a system which is simple and relatively inexpensive. Other objects and features will be in part apparent and in part pointed out hereinafter.

Briefly, the invention concerns a fluid flow system having first and second fluid flow paths. Apparatus is provided for maintaining the fluid velocity in the first path within preselected limits relative to the fluid velocity in the second path, the apparatus includes first and second heat dissipating devices adapted to be cooled by the passage of fluid thereby. The first device is located in the first fluid flow path and the second device is located in the second fluid flow path. Each of the heat dissipating devices includes a respective thermistor for detecting its temperature. The thermistors are serially interconnected in a voltage divider, there being a junction between the thermistors for providing a voltage which is a function of the relative temperatures of the devices. The apparatus further includes means adapted when energized to vary or modify the relative fluid velocities in the paths and circuit means, including semiconductor current switching means, responsive to the voltage at the junction between the thermistors for energizing the flow modifying means when the temperature of the first device increases in relation to the temperature of the second device whereby the flow modifying means is energized to maintain the fluid velocity in the first path within the preselected limits relative to the fluid velocity in the second path.

The invention accordingly comprises the apparatus hereinafter described, the scope of the invention being indicated in the following claims.

In the accompanying drawings in which several of various possible embodiments of the invention are illustrated, FIG. 1 is a perspective view with parts broken away of a refrigerator evaporator provided with frost buildup sensing apparatus according to the present invention;

FIG. 2 is a side view, partially broken away, of an air flow sensor employed in the apparatus of FIG. 1;

FIG. 3 is a schematic circuit diagram of an automatic defroster system responsive to the sensors shown in FIG. 1 for defrosting the evaporator;

FIG. 4 is a side view with parts broken away of another embodiment of air flow frost detection apparatus including a streamlined body for enhancing sensor sensitivity to frost buildup; and FIG. 5 is a view similar to FIG. 3 showing the effect of a buildup of frost on the streamlined body.

Corresponding reference characters indicate corresponding parts throughout the several views of the drawings.

Referring now to FIG. 1, there is indicated at 11 a conventional refrigerator evaporator. Evaporator 11 includes convoluted tubing 13 for carrying refrigerant and a plurality of plates or fins 15 for increasing the area of the heat exchange surface. Air is driven across the evaporator 11 to be cooled thereby by a fan 17 driven by a motor 19. The air flow is guided by ducting which is indicated at 21 only by broken lines so as not to obscure the drawing.

The fins 15 divide the air stream into channels across evaporator 11. Most of the fins are spaced quite close together to provide narrow channels 23 which effect a rapid interchange of heat between the air and evaporator 11. However, two of the fins 15 are widely spaced providing a relatively open channel 25 through the evaporator.

In typical applications evaporator 11 is subject to frost buildup. As frost builds up on tubing 13 and fins 15, the relatively narrow channels 23 become obstructed by the frost so that the air flow therethrough becomes appreciably reduced or attenuated. However, channel 25, being of larger cross section, is left relatively unobstructed by an accumulation of frost which would obstruct one of the channels 23. Accordingly, it can be seen that the velocity of the air flow in the channels 23 relative to the velocity of the air flow in channel 25 varies as a function or measure of the accumulation of frost on evaporator 11.

An elongate heat dissipating sensor S1 is mounted on evaporator 11 in one of the channels 23 and a similar sensor S2 is mounted in the channel 25. Sensors S1 and S2 are oriented so that they extend substantially in the direction of the respective fluid flow so as to provide a large portion of the sensor's surface in contact with the moving air stream thereby to obtain good thermal coupling. The constructions of the sensors is shown in FIG. 2. Each sensor includes an elongate tubular heater (H1, H2) which may, for example, be constituted by a conventional wire wound resistor and an NTC thermistor (TH1, TH2) cemented within the respective heater for sensing its temperature.

Referring to FIG. 3, A.C. electric power for energizing the refrigeration apparatus and the automatic defroster system is obtained through a pair of leads L1 and L2 from a conventional source or supply mains (not shown). A conventional compressor motor 31 is provided for driving refrigerant through a cooling cycle including passage through evaporator 11. Compressor motor 31 is connected across leads L1 and L2 by a circuit which includes normally open relay contacts RY1A and the normally closed side of a set of relay contacts RY2A. A defrost heater H3 is connected across leads L1 and L2 by a circuit which includes the normally open side of contacts RY2A. Heater H3 is adapted when energized to remove accumulated frost from evaporator 11. Since heater H3 and the compressor 31 are connected to the opposite sides of contacts RY2A, they cannot be energized simultaneously so as to oppose each other. By removing frost which is obstructing air flow through evaporator 11, heater H3 essentially constitutes a flow modifying means which can increase the flow through the restricted channels 23 relative to the flow through the open channel 25.

Contacts RY1A are operated by a control winding RY1 and contacts RY2A are operated by a control winding RY2, the interconnection of these windings being described in greater detail hereinafter. These relays may, for example, be of the so-called warpswitch type in which the operating winding is constituted by a heater element which heats a bimetallic actuator to operate the contacts. Winding RY2 also operates a set of contacts RY2B for a purpose described hereinafter. Winding RY1 also operates a set of contacts RY1B.

The primary winding 35 of a transformer T1 is also connected across leads L1 and L2. Transformer T1 includes a secondary winding 37 having a center tap 39. This tap is grounded as at 41. The opposite ends of secondary winding 37 are connected to a pair of supply lines L3 and L4 for applying A.C. voltages of opposite phase thereto. Heaters H1 and H2 are connected in series across lines L3 and L4.

Relay control winding RY1 is connected between line L3 and ground by a circuit which includes a diode D1 and the anode-cathode circuit of an SCR (silicon controlled rectifier) Q1. Diode D1 is orented so that winding RY1 can be energized by SCR Q1 only when line L3 is positive with respect to ground. Relay control winding RY2 is connected between supply line L4 and ground by a circuit which includes a diode D2 and the anode-cathode circuit of SCR Q1. Diode D2 is oriented so that winding RY2 can be energized only when line L4 is positive with respect to ground. Thus winding RY1 can be energized during A.C. half cycles of one polarity and winding RY2 can be energized during the alternate A.C. half cycles.

The collector-emitter circuit of an NPN transistor Q2 is connected between the anode and the gate electrode of SCR Q1 by a circuit which includes a current limiting resistor R1. Thus SCR Q1 can be triggered into conduction by conduction in transistor Q2. By virtue of its connection to the gate electrode of SCR Q1, the emitter of transistor Q2 is maintained substantially at ground potential. Conduction in transistor Q2 is thus determined substantially by the voltage applied to its base electrode with respect to ground.

Thermistors TH1 and TH2 are interconnected in a voltage divider 45 which is connected across lines L3 and L4. In addition to the thermistors, voltage divider 45 includes a pair of diodes D3 and D4 which isolate divider 45 from lines L3 and L4 on those A.C. half cycles when line L3 is positive with respect to line L4, a pair of fixed resistors R1 and R2, a trimming rheostat R3 and the normally closed side of contacts RY2B. The base terminal of transistor Q2 is connected to voltage divider 45 at a junction 47 which is between the thermistors TH1 and TH2. A fixed resistor R4 and a rheostat R5 are connected between junction 47 and the normally open side of contacts RY2B so as to be substituted into voltage divider 45 in place of thermistor TH1 and rheostat R3 when relay operating winding RY2 is energized.

An NTC thermistor TH3 is provided for sensing the temperature in the refrigerator food compartment. Thermistor TH3 is interconnected in a voltage divider 49 which is also connected across lines L3 and L4. Voltage divider 49 includes a pair of diodes D5 and D6 which isolate it from the lines L3 and L4 on those A.C. half cycles when line L3 is negative with respect to line L4. Thus, voltage divider 49 is egectively connected across lines L3 and L4 alternately with voltage divider 45 on successive A.C. half cycles. Voltage divider 49 also includes fixed resistors R6, R7 and R8 and a rheostat R9. Contacts RY1B normally shunt resistances R7 and R9. The base terminal of transistor Q2 is connected to divider 49 at a junction 50 which is between thermistor TH3 and rheostat R9.

When the passage of air through evaporator 11 is not obstructed by frost, the compressor motor 31 is operated under the control of thermistor TH3. This operation is as follows, only those A.C. half cycles when diodes D1, D5 and D6 are forward biased being considered. As the refrigerator warms up so that cooling is needed to maintain its temperature at the desired predetermined level, the resistance of thermistor TH3 decreases so that the total resistance in the upper portion of voltage divider 49 becomes smaller than the resistance in the lower portion, i.e., the resistance of resistor R8. A positive voltage is thus developed at junction 50 and is applied to the base of transistor Q2 thereby biasing it into conduction. As noted previously, conduction in transistor Q2 triggers SCR Q1 into conduction also. Conduction in the anode-cathode circuit of SCR Q1 energizes the relay control winding RY1 from line L3. When winding RY1 is energized, contacts RY1A close thereby energizing the compressor motor 31 to provide more cooling.

Simultaneously with the energization of compressor motor 31, contacts RY1B are opened thereby effectively inserting resistances R7 and R9 into voltage divider 49. This change in the balance of divider 49 is regenerative, that is, it increases the bias on transistor Q2 and therefore a finite temperature differential is provided in the operation of this circuit in response to changes in resistance of thermistance TH3. The magnitude of the differential may be adjusted by varying the setting of rheostat R9. As is understood by those skilled in the art, the differential eliminates hunting and insures that compressor motor 31 will run for an appropriate interval before the temperature differential is overcome. Under normal operating conditions, the compressor motor will thus be recycled at intervals to maintain the refrigerator temperature substantially at a predetermined level.

The automatic defrost system operates as follows, only those A.C. half cycles when diodes D2, D3 and D4 are forward biased being considered. The power consumed by heaters H1 and H2 is dissipated to the air streams in the respective channels (23, 25) through the evaporator 11. The temperature of each of the sensors is thus a function of the velocity of the respective air stream, higher velocities providing more cooling and lower temperatures. When evaporator 11 is substantially free of frost, the air velocity in the two sensor channels is approximately the same. The sensors S1 and S2 thus reach equilibrium at about the same temperatures and the thermistors TH1 and TH2 exhibit substantially the same resistances. The normal balance of voltage divider 45, adjusted by means of rheostat R3, is such that the voltage at junction 47 is negative with respect to ground and transistor Q2 is cut off. Relay operating winding RY2 is therefore left in its de-energized state.

If, however, an amount of frost beyond a preselected limit accumulates on evaporator 11, the passage 23 within which sensor S1 is positioned becomes restricted and the amount of cooling air provided to sensor S1 is reduced. As the amount of cooling air is decreased, the temperature of sensor S1 rises and the resistance of the respective thermistor TH1 decreases. As the resistance of the thermistor TH1 decreases relative to the resistance of thermistor TH2, a positive voltage is provided at junction 47 and transistor Q2 is forward biased into conduction. SCR Q1 is therefore triggered into conduction and relay operating winding RY2 is energized from line L4. Energization of winding RY2 causes contacts RY2A to be operated to a position opposite that shown, thereby energizing the defrost heater and removing power from the compressor motor CM so that it cannot be energized even if contacts RY1A are closed. Since the buildup of frost anywhere along the sensed channel 23 will reduce the flow of air therethrough, it can be seen that this system is responsive to frost conditions over a substantial portion of the evaporator, which portion is highly likely to be representative of the rest of the evaporator.

Simultaneously with the energization of heater H3, the contacts RY2B are actuated to substitute the resistances R4 and R5 for the resistances of resistor R3 and thermistor TH1. As the frost is removed from evaporator 11, its temperature rises. This temperature rise is also transmitted to sensor S2 and when the resistance of the respective thermistor TH2 falls to a value such that the resistance in the upper portion of divider 45 is less than that in the lower portion, the defrost operation is terminated by the negative voltage thereby applied to the base terminal of transistor Q2. The point at which defrosting is terminated is determined by the setting of rheostat R5 and is preselected to produce a substantially complete elimination of frost.

Since the defrost initiating control is sensitive to changes in the air velocity in the one channel relative to the velocity in the one channel relative to the velocity in the other channel, it is essentially unaffected by changes, such as fan speed variations, which affect both channels substantially proportionately. Similarly, since the two temperature sensing thermistors employed for frost detection are connected in series across supply lines providing out-of-phase voltages, any disturbances which may affect the supply voltages are substantially cancelled and do not affect the control operation.

In FIGS. 4 and 5 there is illustrated a construction for increasing the sensitivity of a heat dissipating air flow sensor to frost buildup. On this construction a streamlined body, such as the teardrop form illustrated at 55, is mounted in the air flow upstream from the fluid velocity sensor S1. An air foil form may also be used. Body 55 is thermally coupled to the evaporator tubing 13 so that frost will accumulate on body 55 as well as on the rest of the evaporator. Sensor S1 is located relative to body 55 so that when the body is not coated with frost, the converging air stream in back of the body converges directly on the sensor as shown in FIG. 4. However, when the body 55 becomes coated with frost as indicated at 56 in FIG. 5, the natural point of convergence shifts so as to miss the sensor S1. The sensor is then surrounded only by relatively stagnant air. In this way a very marked change in the amount of air cooling provided to sensor S1 is obtained from a relatively small buildup of frost so that the circuit of FIG. 3 will be operated before a serious accumulation of frost has developed.

While the use of air flow sensing to control a defrosting operation has been illustrated, it should be understood that this apparatus may be used in other applications. For example this system may be used in controlling the relative flows along different heating ducts supplied from a common source or to initiate automatic filter cleaning operations when a filter system becomes obstructed by accumulated material.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:

1. In a fluid flow system having first and second fluid flow paths, apparatus for maintaining the fluid velocity in said first path within preselected limits relative to the fluid velocity in said second path; said apparatus comprising:

first and second heat dissipating devices adapted to be cooled by the passage of said fluid thereby, said first device being located in said first fluid flow path, said second device being located in said second fluid flow path, each of said devices including a respective thermistor for detecting the temperature of the device, said thermistors being serially interconnected in a voltage divider, there being a junction between said thermistors for providing a voltage which is a function of the relative temperatures of said devices;

flow modifying means adapted when energized to vary the relative fluid velocities in said paths; and circuit means, including semiconductor current switching means, responsive to the voltage at said junction for energizing said flow modifying means when the temperature of said first device increases in relation to the temperature of said second device whereby said flow modifying means is energized to maintain the fluid velocity in said first path within said limits relative to the fluid velocity in said second path.

2. A fluid flow system as set forth in claim 1 wherein said semiconductor switching means includes an SCR.

3. A fluid flow system as set forth in claim 2 including a transistor for controlling triggering of said SCR.

4. A fluid flow system as set forth in claim 3 in which said junction is connected to the base terminal of said transistor.

5. A fluid flow system as set forth in claim 4 in which the emitter collector circuit of said transistor is connected between the anode and gate terminals of said SCR.

6. A fluid flow system as set forth in claim 1 in which each of said heat dissipating devices includes an elongate heater which extends substantially in the direction of the respective fluid flow path.

7. In a fluid flow system having first and second fluid flow paths, apparatus for maintaining the fluid velocity in said first path substantially within preselected limits relative to the fluid velocity in said second path; said apparatus comprising:

first and second heat dissipating devices each of which includes an elongate heater and a thermistor for sensing the temperature of the heater, said first device being located in said first fluid flow path with the respective heater extending substantially in the direction of the fluid flow to be cooled thereby, said second device being located in said second fluid flow path with the respective heater extending substantially in the direction of the fluid flow to be cooled thereby;

flow modifying means adapted when energized to vary the relative fluid velocities in said paths; and means, responsive to the relative temperatures sensed by said thermistors, for energizing said flow modifying means when the temperature of said first device increases in relation to the temperature of said second device whereby said flow modifying means is energized to maintain the fluid velocity in said first path within said limits relative to the fluid velocity in said second path.

8. A fluid flow system as set forth in claim 7 wherein said heaters are tubular in configuration and said thermistors are located within said heaters.

9. In refrigeration apparatus having a heat exchange surface which is subject to frost buildup, a defroster adapted when energized to remove frost from said surface and means for moving a fluid across said surface to cool said fluid; an automatic defrosting system comprising:

first and second heat dissipating devices adapted to be cooled by the passage of said fluid thereby, said first device being located in a fluid flow path which becomes relatively obstructed by the buildup of frost on said surface, said second device being located in a fluid flow path which remains relatively unobstructed as frost builds up on said surface, each of said devices including a respective thermistor for detecting the temperature of the device, said thermistors being serially interconnected in a voltage divider, there being a junction between said thermistors for providing a voltage which is a function of the relative temperatures of said devices; and circuit means, including semiconductor current switching means, responsive to the voltage at said junction for energizing said defroster when the temperature of said first device increases in relation to the temperature of said second device due to obstruction of the respective fluid flow path whereby, when frost accumulates on said surface in excess of a predetermined level to obstruct fluid flow past said first device, said defroster is energized to remove the frost.

10. In refrigeration apparatus having a heat exchange surface which is subject to frost buildup, a defroster adapted when energized to remove frost from said surface and means for moving a fluid across said surface to cool said fluid; an automatic defrosting system comprising:

first and second heat dissipating devices each of which includes an elongate heater and a thermistor for sensing the temperature of the heater, said first device being located in a fluid flow path which becomes relatively obstructed by the buildup of frost on said surface with the respective heater extending substantially in the direction of the fluid flow to be cooled thereby, said second device being located in a fluid flow path which remains relatively unobstructed as frost builds up on said surface with the respective heater extending substantially in the direction of fluid flow to be cooled thereby; and means responsive to the relative temperatures detected by said thermistors for energizing said defroster when the temperature of said first device increases in relation to the temperature of said second device due to obstruction of the respective fluid flow path whereby, when frost accumulates on said surface in excess of a predetermined level to obstruct fluid flow past said first device, said defroster is energized to remove the frost.

11. Refrigeration apparatus as set forth in claim 10 including a streamlined body thermally coupled to said heat exchange surface upstream of said first device, said first device being located at a point where the flow converges behind said body when said body is not frosted, an accumulation of frost on said body being operative to deflect the flow and to move the point of convergence away from said device.

12. In refrigeration apparatus having a heat exchange surface which is subject to frost bulidup, a defroster adapted when energized to remove frost from said surface and means for moving a fluid across said surface to cool said fluid; an automatic defrosting system comprising:

a streamlined body thermally coupled to said surface to cool therewith and to similarly accumulate frost;

a heat dissipating device located in the path of said fluid downstream of said body at a point where said flow converges when said body is not frosted, an accumulation of frost on said body being operative to deflect said flow and to move the point of flow convergence away from said device, said device including means for sensing its temperature; and means responsive to the sensed temperature for energizing said defroster when the temperature of said device exceeds a preselected threshold whereby a buildup of frost on said body which moves the converging flow of cooling air away from said device energizes said defroster to remove the frost.

References Cited

UNITED STATES PATENTS 3,039,278  6/1962  Thompson _____ 62—140
3,220,208  11/1965  Oram _____ 62—140

MEYER PERLIN, *Primary Examiner.*